US006539450B1

(12) United States Patent
James et al.

(10) Patent No.: US 6,539,450 B1
(45) Date of Patent: Mar. 25, 2003

(54) METHOD AND SYSTEM FOR ADJUSTING ISOCHRONOUS BANDWIDTHS ON A BUS

(75) Inventors: David V. James, Palo Alto, CA (US); Bruce Fairman, Woodside, CA (US); David Hunter, Santa Barbara, CA (US); Hisato Shima, Mountain View, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/531,075

(22) Filed: Mar. 18, 2000

Related U.S. Application Data
(60) Provisional application No. 60/167,958, filed on Nov. 29, 1998.

(51) Int. Cl.[7] .................................................. G06F 1/00
(52) U.S. Cl. ........................ 710/306; 710/307; 710/312; 710/313; 710/310; 710/60; 710/61
(58) Field of Search ................................. 710/129, 128, 710/33, 34, 35, 58, 59–61, 126, 127, 305–307, 310, 311, 312, 313; 709/231, 232, 233–235, 238–240, 246; 713/501–503

(56) References Cited

U.S. PATENT DOCUMENTS

| | | | | |
|---|---|---|---|---|
| 4,373,183 A | * | 2/1983 | Means et al. ................ 710/100 |
| 4,538,259 A | | 8/1985 | Moore .......................... 370/60 |
| 4,935,894 A | | 6/1990 | Ternes et al. | |
| 5,381,138 A | | 1/1995 | Stair et al. ............. 340/825.44 |
| 5,402,416 A | | 3/1995 | Cieslak et al. ................ 370/60 |
| 5,485,505 A | | 1/1996 | Norman et al. ................ 379/58 |
| 5,511,165 A | | 4/1996 | Brady et al. | |
| 5,603,084 A | | 2/1997 | Henry, Jr. et al. ......... 455/33.1 |
| 5,623,483 A | | 4/1997 | Agrawal et al. ............ 370/253 |
| 5,684,796 A | | 11/1997 | Abidi et al. ................ 370/389 |
| 5,684,959 A | | 11/1997 | Bhat et al. ............. 395/200.11 |
| 5,689,499 A | | 11/1997 | Hullett et al. ................ 370/235 |
| 5,724,517 A | | 3/1998 | Cook et al. ............. 395/200.57 |
| 5,734,824 A | | 3/1998 | Choi ..................... 395/200.11 |
| 5,751,967 A | | 5/1998 | Raab et al. ............. 395/200.58 |
| 5,757,772 A | | 5/1998 | Thornberg et al. .......... 370/236 |
| 5,764,930 A | | 6/1998 | Staats ......................... 710/107 |
| 5,774,683 A | | 6/1998 | Gulick | |
| 5,790,530 A | | 8/1998 | Moh et al. .................. 370/363 |

(List continued on next page.)

FOREIGN PATENT DOCUMENTS

WO    PCT/US00/42429    11/2000

OTHER PUBLICATIONS

Gary Hoffman & Daniel Moore, IEEE 1394: "A Ubiquitous Bus," COMPON '95, San Francisco, CA, Mar. 5 to 9, 1995, pp. 1–9.

Roger Jennings, Fire on the Wire: "The IEEE 1934 High Performance Serial Bus," Copyright ©1995, 1996, 1997, 1998, 1999.

1394 Trade Association, The Multimedia Connection, TA Document 1999026, AV/C General Command and Response Model 4.0, Draft 0.1:35, May 22, 1999, pp. 1–46.

1394 Trade Association, The Multimedia Connection, TA Document 1999025, AV/C General–Descriptor and Info Block Mechanism, Draft 0.2:212, Dec. 17, 1999, pp. 1–143.

*Primary Examiner*—Peter Wong
*Assistant Examiner*—Raymond N Phan
(74) *Attorney, Agent, or Firm*—Blakely, Sokoloff, Taylor & Zafman LLP

(57) ABSTRACT

A method and system for adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals.

29 Claims, 10 Drawing Sheets

U.S. PATENT DOCUMENTS

| | | | |
|---|---|---|---|
| 5,790,815 A | 8/1998 | Swanstrom et al. | |
| 5,812,774 A | 9/1998 | Kempf et al. | 395/200.42 |
| 5,815,678 A * | 9/1998 | Hoffman et al. | 710/306 |
| 5,825,752 A * | 10/1998 | Fujimori et al. | 370/260 |
| 5,832,245 A | 11/1998 | Gulick | |
| 5,842,124 A | 11/1998 | Kenagy et al. | 455/418 |
| 5,848,266 A * | 12/1998 | Schuerich | 713/503 |
| 5,854,910 A | 12/1998 | Gulick | |
| 5,870,387 A | 2/1999 | Mulla | 370/258 |
| 5,872,524 A | 2/1999 | Iida | 340/825.52 |
| 5,872,944 A | 2/1999 | Goldrian et al. | |
| 5,875,301 A | 2/1999 | Duckwall et al. | 395/200.51 |
| 5,883,621 A | 3/1999 | Iwamura | 345/327 |
| 5,892,929 A | 4/1999 | Welker | 710/107 |
| 5,901,332 A | 5/1999 | Gephardt et al. | |
| 5,905,732 A | 5/1999 | Fimoff et al. | 370/516 |
| 5,910,178 A | 6/1999 | Moh et al. | 709/232 |
| 5,920,267 A | 7/1999 | Tattersall et al. | 340/825.05 |
| 5,923,673 A | 7/1999 | Henrikson | |
| 5,930,703 A | 7/1999 | Cairns | 455/418 |
| 5,935,208 A | 8/1999 | Duckwall et al. | 709/221 |
| 5,941,964 A | 8/1999 | Young et al. | |
| 5,961,623 A | 10/1999 | James et al. | 710/113 |
| 5,970,234 A | 10/1999 | Jin | |
| 5,974,036 A | 10/1999 | Acharya et al. | 370/331 |
| 5,978,854 A | 11/1999 | Fujimori | 709/245 |
| 5,991,520 A * | 11/1999 | Smyers et al. | 710/100 |
| 6,005,852 A | 12/1999 | Kokko et al. | 370/329 |
| 6,023,732 A | 2/2000 | Moh et al. | 709/232 |
| 6,032,211 A * | 2/2000 | Hewitt | 710/107 |
| 6,038,625 A | 3/2000 | Ogino et al. | 710/104 |
| 6,055,561 A | 4/2000 | Feldman et al. | 709/200 |
| 6,072,772 A | 6/2000 | Charny et al. | 370/229 |
| 6,085,270 A * | 7/2000 | Gulick | 710/100 |
| 6,104,706 A | 8/2000 | Richter et al. | 370/263 |
| 6,108,718 A | 8/2000 | Fujimori et al. | 710/9 |
| 6,119,243 A * | 9/2000 | Garney et al. | 713/600 |
| 6,131,119 A | 10/2000 | Fukui | 709/224 |
| 6,137,777 A | 10/2000 | Vaid et al. | 370/230 |
| 6,138,178 A | 10/2000 | Watanabe | 710/8 |
| 6,138,196 A | 10/2000 | Takayama et al. | 710/105 |
| 6,141,767 A | 10/2000 | Hu et al. | 714/1 |
| 6,151,651 A * | 11/2000 | Hewitt | 710/129 |
| 6,185,632 B1 | 2/2001 | Berkema | |
| 6,192,428 B1 | 2/2001 | Abramson et al. | 710/52 |
| 6,243,783 B1 * | 6/2001 | Smyers et al. | 710/311 |
| 6,252,856 B1 * | 6/2001 | Schwager et al. | 370/443 |
| 6,266,702 B1 * | 7/2001 | Darnell et al. | 709/236 |
| 6,295,516 B1 * | 9/2001 | Takeyasu | 703/13 |

\* cited by examiner

METHOD AND SYSTEM FOR ADJUSTING ISOCHRONOUS BANDWIDTHS ON A BUS

This application claims benefit of U.S. Provisional Application No. 60/167,958 filed Nov. 29,1999.

FIELD OF THE INVENTION

The present invention relates generally to audio, video, and audio/video interconnected systems for home and office use. More particularly, the present invention relates to a method and system for adjusting isochronous bandwidth allocations in a digital bus system.

BACKGROUND OF THE INVENTION

With the development of consumer electronic audio/video (A/V) equipment, and the advance of digital A/V applications, such as consumer A/V device control and signal routing and home networking, various types of data in various formats can now be transferred among several audio/video control (AV/C) devices via one digital bus system. However, many current systems do not have sufficient bandwidth resources to transfer and display all the different types of data at the same time.

Typical computer systems solve the bandwidth problem by increasing the bandwidth of the system bus to handle all of these forms, types and amount of data. As a result, as users request more types of information, such as in multimedia applications, the system bus has become more clogged with information other than information directly utilized and needed by the main processor.

Many computer systems incorporate at least two buses. A first bus, commonly referred to as a memory bus, is typically used for communications between a central processor and a main memory. A second bus, known as a peripheral bus, is used for communications between peripheral devices such as graphics systems, disk drives, or local area networks. To allow data transfers between these two buses, a bus bridge is utilized to "bridge," and thereby couple, the two buses together.

One example of a high-speed bus system for interconnecting A/V nodes, configured as a digital interface used to transport commands and data among interconnecting audio/video control (AV/C) devices, is the IEEE 1394 standard serial bus implemented by IEEE Std 139–41995, *Standard For A High Performance Serial Bus*, Aug. 30, 1996 (hereinafter "IEEE 1394 standard") and related other 1394 standards.

The IEEE 1394 standard is an international standard for implementing a high-speed serial bus architecture, which supports both asynchronous and isochronous format data transfers. The IEEE 1394 standard defines a bus as a noncyclic interconnect, consisting of bus bridges and nodes. Within a non-cyclic interconnect, devices may not be connected together so as to create loops. Within the non-cyclic interconnect, each node contains an AV/C device, and bus bridges serve to connect buses of similar or different types.

The primary task of a bridge is to allow data to be transferred on each bus independently without degrading the performance of the bus, except when traffic crosses the bus bridge to reach the desired destination on the other bus. To perform this function, the bridge is configured to understand and participate in the bus protocol of each of the buses.

Multi-bus systems are known to handle the large amounts of information being utilized. However, communication between buses and devices on different buses is difficult.

Typically, a bus bridge may be used to interface I/O buses to the system's high-performance processor/memory bus. With such I/O bridges, the CPU may use a 4-byte read and write transaction to initiate DMA transfers. When activated, the DMA of a serial bus node generates split-response read and write transactions which are forwarded to the intermediate system backbone bus which also implements serial bus services.

Depending on the host system design, the host-adapter bridge may have additional features mandated by differences in bus protocols. For example, the host bus may not directly support isochronous data transfers. Also, the host-adapter bridge may enforce security by checking and translating bridge-bound transaction addresses and may often convert uncached I/O transactions into cache-coherent host-bus transaction sequences.

Each time a new device or node is connected or disconnected from an IEEE 1394 standard serial bus, the entire bus is reset and its topology is reconfigured. The IEEE 1394 standard device configuration occurs locally on the bus without the intervention of a host processor. In the reset process, three primary procedures are typically performed; bus initialization, tree identification, and self identification. Within the IEEE 1394 standard, a single node must first be established as the root node during the tree identification process in order for the reconfiguration to occur.

Isochronous data connections have one talker and one or more listeners. The talker broadcasts audio, video, or any other data format. Both the talker and listener are nodes on the digital bus system. Isochronous data is routed by channel numbers from the talker to the listener. The channel numbers are assigned to the data connections dynamically.

Each listener has an associated controller that sets up the isochronous connection between the talker and listener. The controllers signal the bus bridges (through their associated portals) to expect data having a certain bandwidth. Sometimes, the bandwidth allocated for the data being broadcast by the talker must be increased or decreased because the data format changes. For example, a talker may broadcast highly compressed video data at 25 megabits per second and then begin broadcasting lightly compressed video requiring 50 megabits per second of bandwidth.

The change in bandwidth could, of course, be signaled by immediately transmitting the data packets at the higher bandwidth. The bus bridges can detect the larger packets and requested additional bandwidth from their bus local isochronous resource managers (IRMs).

Several problems are encountered by the above described approaches. For example, a certain amount of latency is experienced during the time when the talker begins sending larger data packets until the controller allocates the additional bandwidth necessary. The latency results in lost data packets that are rejected by the digital bus system.

In prior systems, a bandwidth change indication is generally broadcast over the entire bus system because talkers do not know the bus addresses of controllers because numerous bus connections (one for each listener) may be associated with a specific talker, and each listener may be associated with a distinct controller. A reliable broadcast mechanism for sending the bandwidth change indication is difficult to implement since all nodes may not receive the indication. These missed nodes will not return an error message to the digital bus system. Furthermore, a widely broadcast message tends to flood the bus system with messages causing data congestion.

SUMMARY OF THE INVENTION

A method of adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals.

BRIEF DESCRIPTION OF THE DRAWINGS

Features and advantages of the prevention invention will be apparent to one skilled in the art in light of the following detailed description in which.

DETAILED DESCRIPTION

A method and system for adjusting the bandwidth allocated for isochronous data traffic on an interconnected data bus is disclosed. The present system uses an isochronous resource manager (IRM) to sense a bandwidth change request from a talker. The IRM instigates a bandwidth adjustment associated with the bandwidth change request to one or more bus bridge portals. As the request is disseminated throughout the bus, bandwidth allocations are adjusted at each portal until the listener controller is reached.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
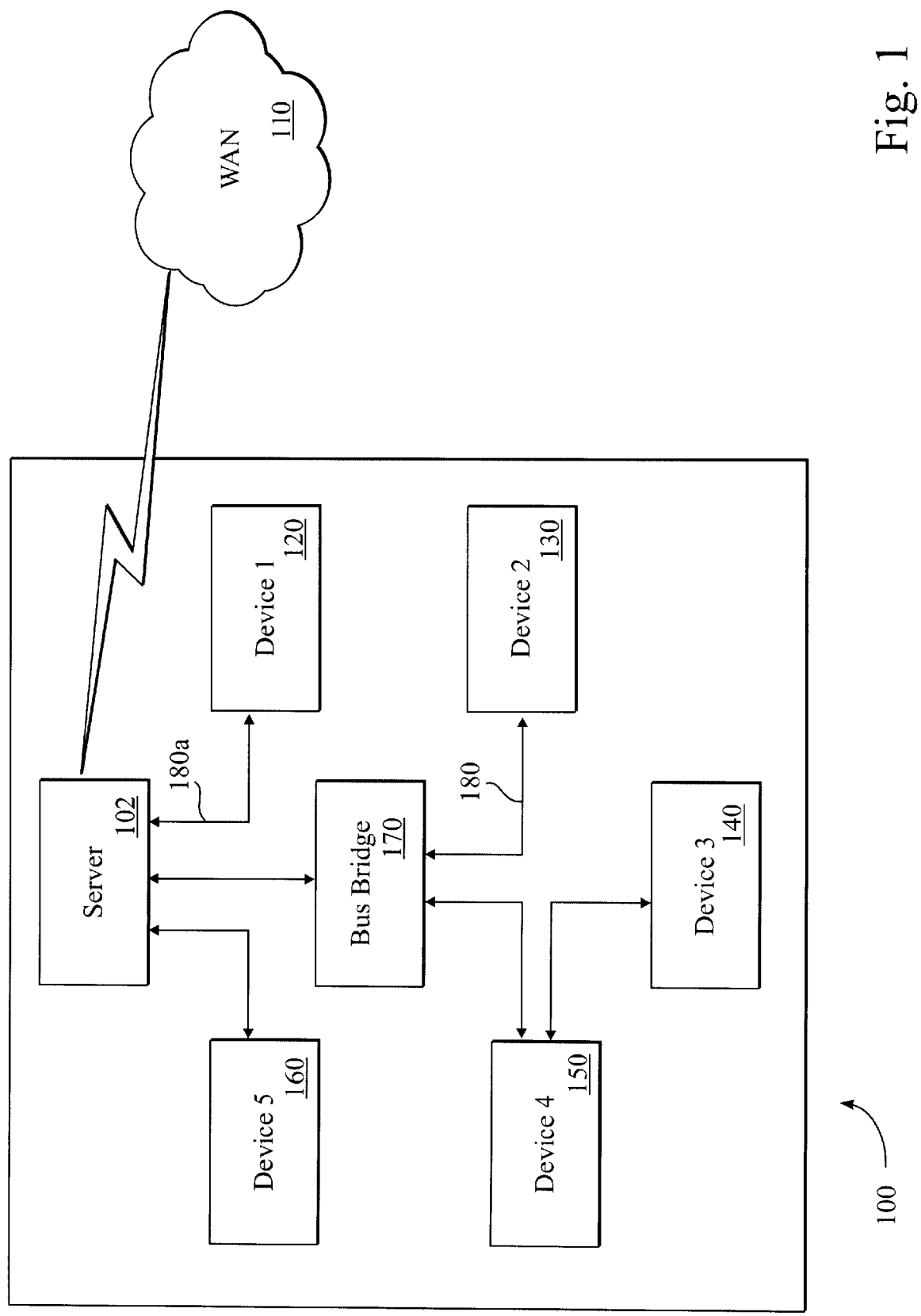
FIG. 1 is a block diagram of one embodiment for an interconnect topology.

FIG. 1 is a block diagram of one embodiment for an interconnect topology 100. Referring to FIG. 1, server 102 is connected to a wide area network (WAN) 110 and to a bus bridge 170. The bus bridge is interconnected to a number of audio, video, and/or audio/video devices, 120, 130, 140, 150, and 160. In one embodiment, the devices (120–160) are connected to bus bridge 170 via the IEEE 1394 standard serial bus. Server 102 may be any device that is capable of connection to both a bus bridge 170 and wide area network 110, such as, for example, a personal computer or a set-top box. In one embodiment, network 110 may be a wide area network, such as, for example, the Internet, or a proprietary network such as America Online®, Compuserve®, Microsoft Network®, or Prodigy®. In addition, WAN 110 may be a television communications network. Server 102 includes a network interface which communicates with WAN 110.

Topology 100 includes high speed serial bus 180a and 180. In one embodiment, serial bus 180 is the IEEE 1394 standard serial bus. Topology 100 includes various consumer electronic devices 120–160 connected via the high speed serial bus 180 to bus bridge 170. The consumer electronic devices 120–160 may include, for example, a printer, additional monitor, a video camcorder, an electronic still camera, a video cassette recorder, digital speakers, a personal computer, an audio actuator, a video actuator, or any other consumer electronic device that includes a serial interface which complies with a serial interface standard for networking consumer electronic devices—for example, the IEEE 1394 standard. Topology 100 may be contained within a home or office. Bus bridge 170 is used to connect devices 120–160 in which devices 120–160 may be physically located within different rooms of the home or office. Although the original IEEE bus standard is designed for use with a cable interconnect, any communication media may be used such as radio frequency (RF) communication or the like.

Figure 2:
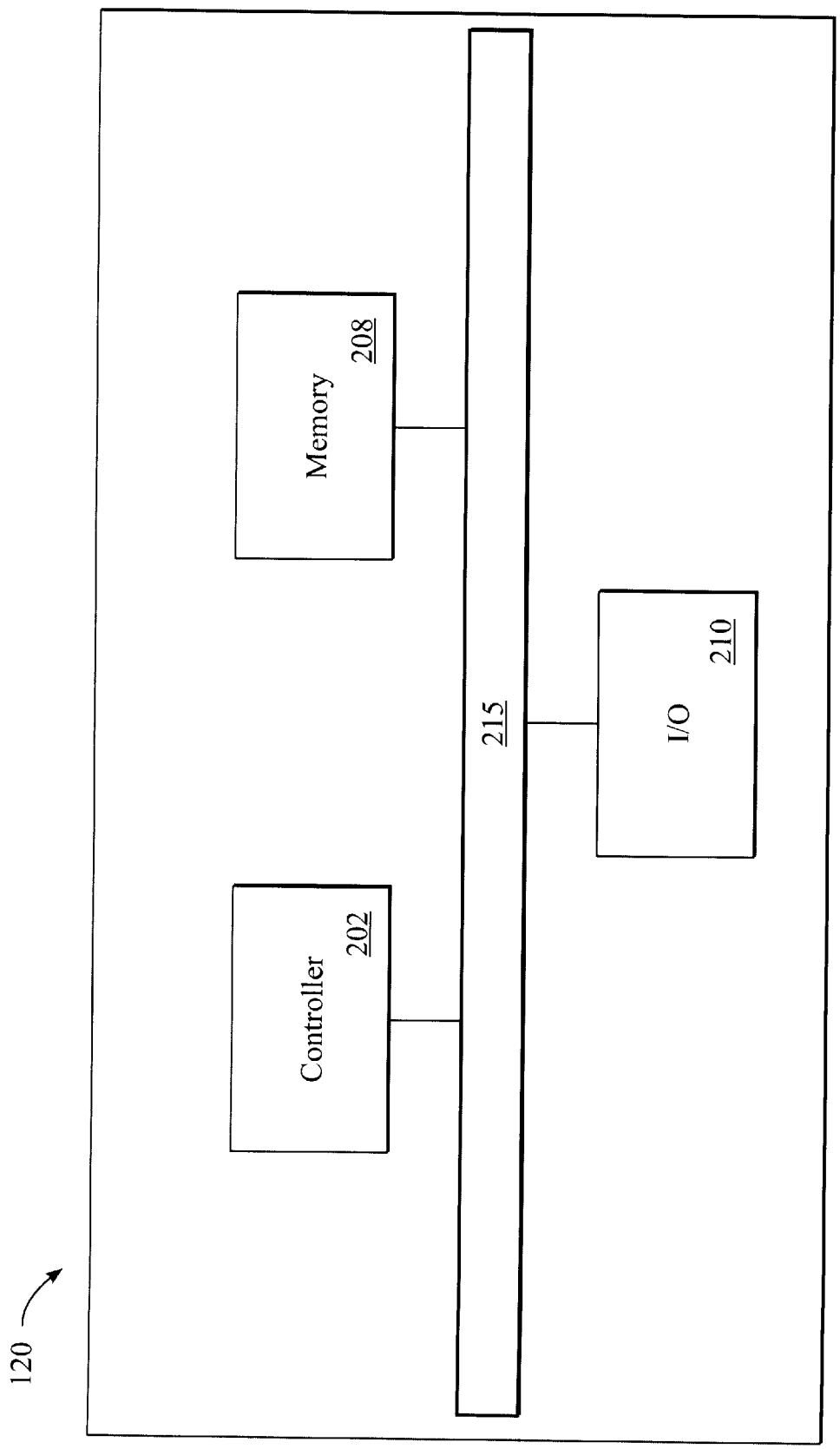
FIG. 2 is a block diagram of a device of FIG. 1.

FIG. 2 is a block diagram of a device 120. Referring to FIG. 2, device 120 may be a laser printer, digital camera, set-top box, or any other appropriate consumer electronic device capable of being connected via a high speed serial bus 180. In one embodiment, the device 120 includes a controller 202, memory 208, and I/O 210, all connected via bus 215. Memory 208 may include, for example, read only memory (ROM), random access memory (RAM), and/or non-volatile memory. I/O 210 provides connection with wide area network 110, bus bridge 170, and another peripheral device (130–160).

In one embodiment, I/O 210 is a serial bus interface that complies with a serial interface standard for networking with consumer electronic devices (120–161) and bus bridge 170 within topology 100. For example, the serial bus interface and topology 100 may use the IEEE 1394 standard serial bus. I/O 210 provides for receiving signals from and transmitting signals to other consumer electronic devices (130–160) or bus bridge 170.

Memory 208 provides temporary storage for voice and data signal transfers between outside network 110 and topology 100. In addition, memory 208 may buffer digital voice and data signals received by I/O 210 from WAN 110 before signals are transmitted onto IEEE 1394 standard bus 180.

Controller 202 controls various operations of device 120. Controller 202 monitors and controls the traffic through the device 120 to and from topology 100 and WAN 110.

Device 120 I/O 210 may have one or more physical ports. A single port device discontinues the bus along the given branch of the bus, whereas devices with two or more ports allow continuation of the bus. Devices with multiple ports permit a daisy chained bus topology, even though the signaling environment is point-to-point. That is, when a multi-port node receives a packet of data, the data is detached and retransmitted to the necessary port as indicated within the data. The configuration is performed dynamically as new devices are attached and/or removed from bus 180.

The 1394 standard bus protocol is designed to support peer-to-peer transfers between devices. This allows serial bus devices to transfer data between themselves without intervention from a computer system or host system. This allows high throughput between devices without affecting the performance of the computer system. Thus, a video camera may be set up to transfer between itself and a video cassette recorder without accessing a computer system.

Figure 3:
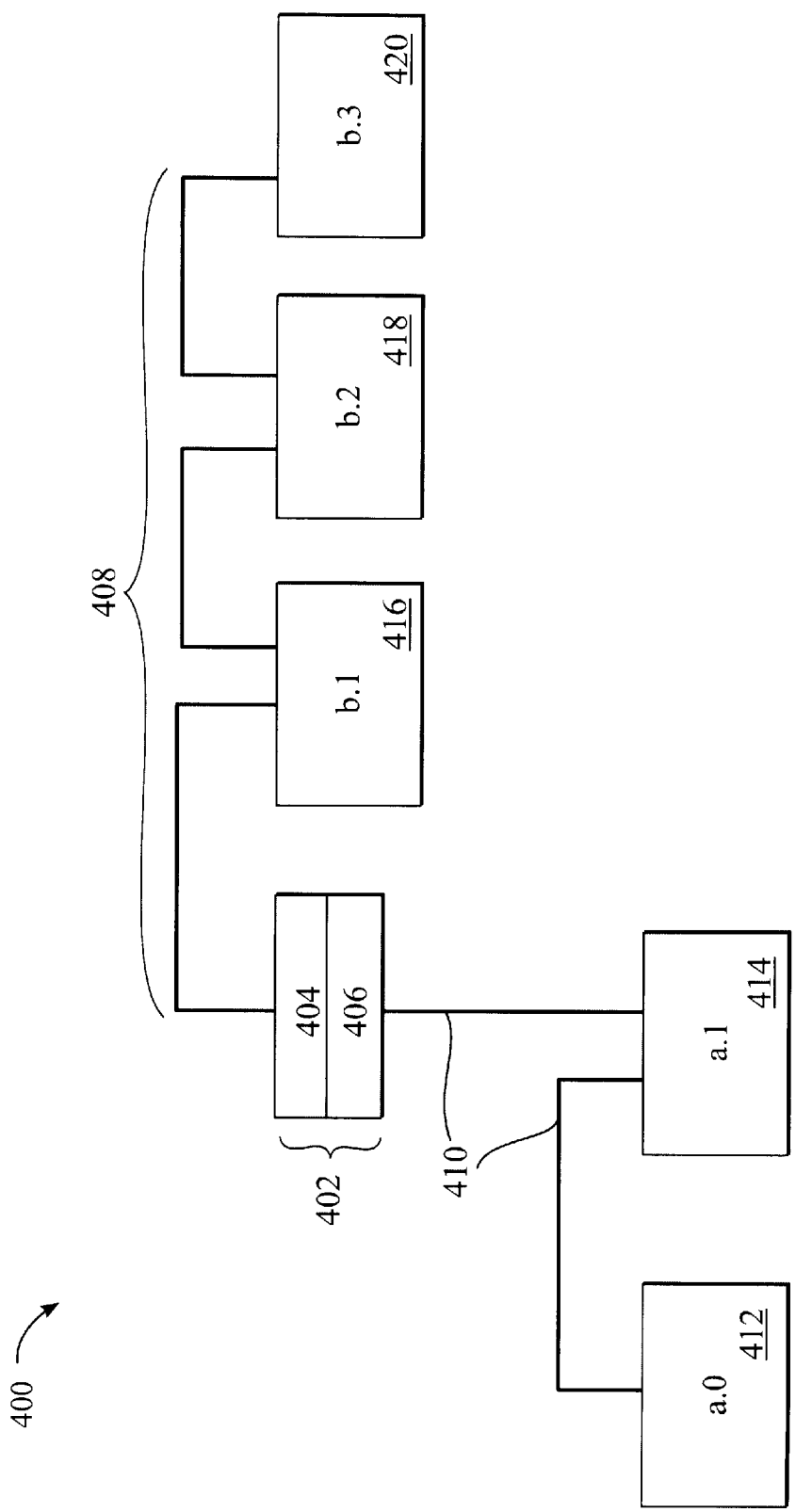
FIG. 3 is a block diagram of one embodiment for a 1394 standard bus bridge system.

FIG. 3 is a block diagram of one embodiment for a 1394 standard bridge bus system 400. Referring to FIG. 3, system 400 includes bridge 402 which connects two or more buses 408 and 410. Bus 408 and 410 may be the same or different types of buses. For example, bus 408 may be a 1394 standard serial bus and bus 410 may be a different high performance bus. The 1394 standard bus architecture limits the number of nodes or devices 310 on a bus 263 and supports multiple bus systems via bus bridge 402.

The control and status register (CSR) architecture, ISO/IEC 13213 (ANSI/IEEE 1212), *Information systemsControl and Status Registers (CSR) Architecture Microcomputer Buses*, defines the 1394 standard bus addressing structure, which allows approximately $2^{16}$ nodes (404, 406, 412–420). The CSR standard defines their registry, their functionality, and, where appropriate, where they appear in the address space.

Figure 4:
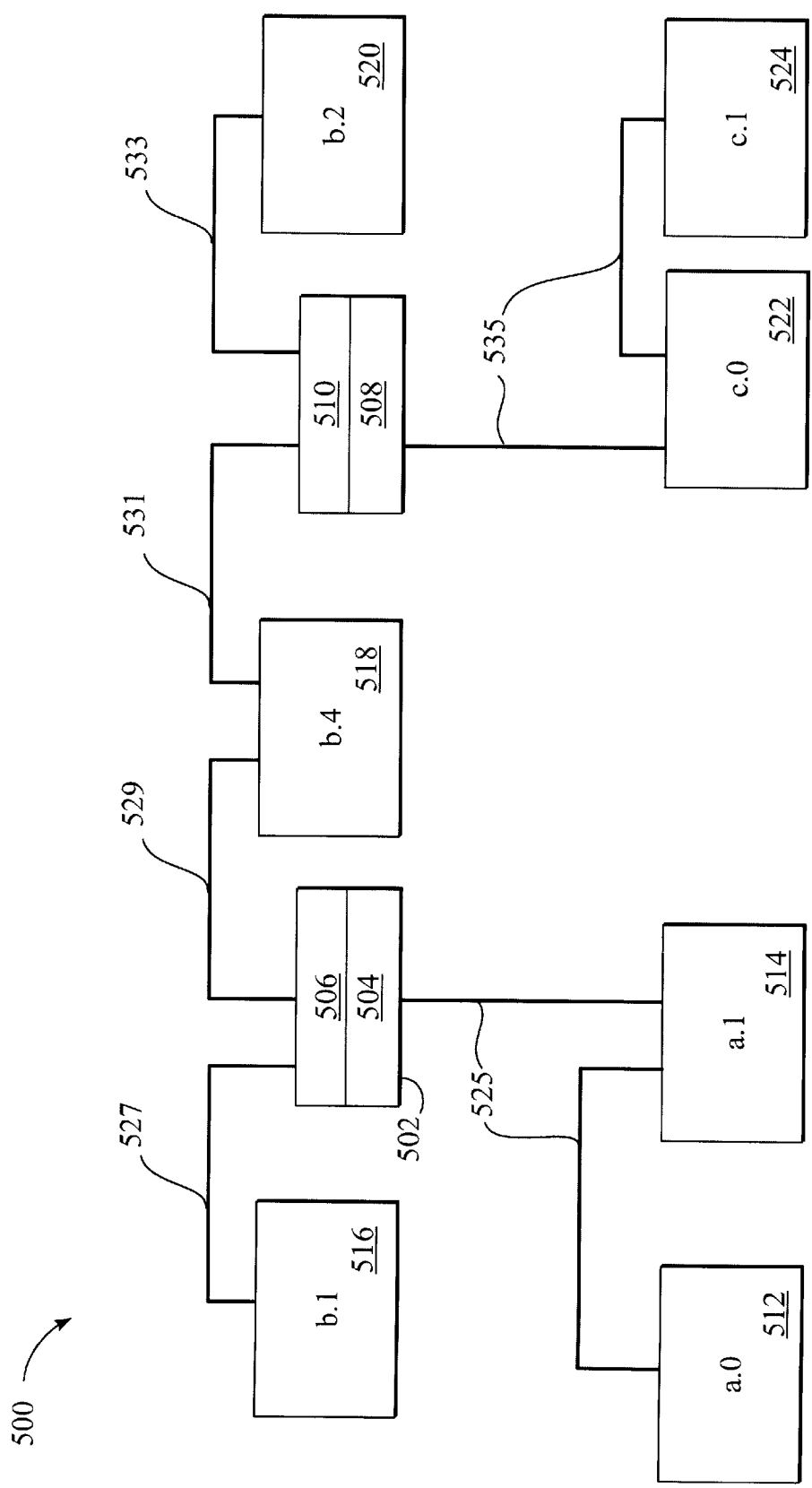
FIG. 4 is a block diagram of one embodiment for a 1394 bus bridge topology.
Figure 5:
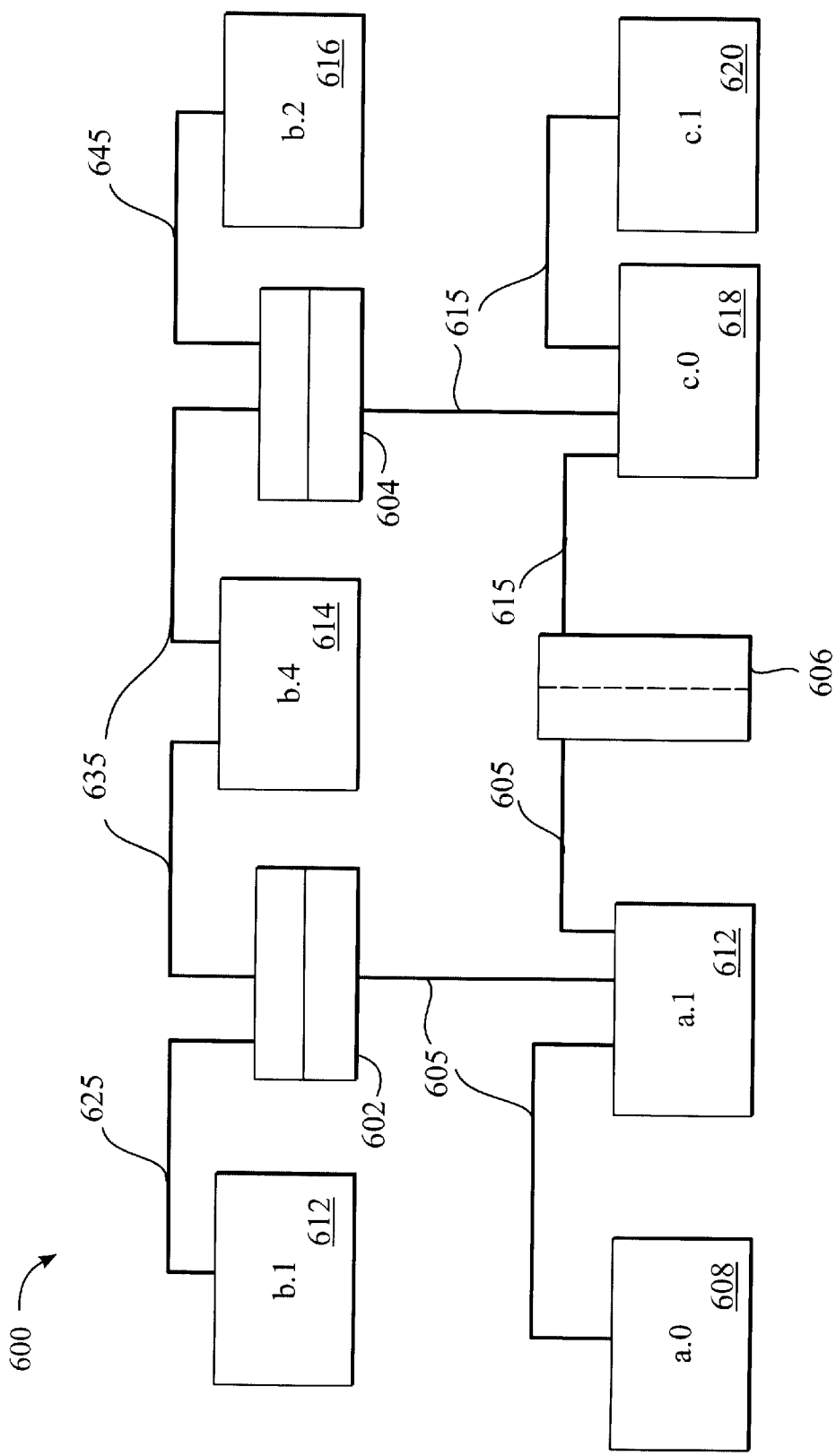
FIG. 5 is a block diagram of one embodiment for a looped bus bridge topology.

FIG. 3 is the simplest instance of a bus topology in which the net has one bus bridge. FIG. 4 illustrates a net that may have more than one bus bridge and, when so structured, is hierarchical in nature. FIG. 5 illustrates a network whose physical topology may have loops, but whose loops are electronically disabled to generate a hierarchical structure. In the description that follows, a collection of multiple buses connected through a bus bridge is referred to as a "net".

FIG. 4 is a block diagram of one embodiment for a 1394 bridge bus topology 500. Referring to FIG. 4, topology 500 has one prime portal 504 and one or more alpha portals 506 and 508. The primary bus 525 has exactly one prime portal 504 and the secondary buses 527, 529, 531, 533, and 535 have exactly one alpha portal each—506,508 and 510. Each bus 525–535 may have any number of secondary portals. An alpha portal is on the path to a prime portal. Any portal not a prime portal or an alpha portal is a secondary portal. The prime portal or the alpha portal may be referred to as a primary portal.

Within an interconnect topology 500, the bridge portal with the largest portal ID identifier is elected to become the prime portal 504. In an alternate embodiment, the bridge portal with the smallest portal ID identifier is elected to become the prime portal 504. Each portal appears as a node on its attached bus. The bus with the prime portal 504 is termed the primary bus 525 and other buses 527–535 are termed secondary buses. On secondary buses 527–535, the bridge portal that leads to the primary bus 525 is called the alpha portal (506,508). After a bridge bus interconnect is configured, any node within the interconnect may be accessed by its unique 16-bit node identification address. The node identification address contains the bus ID and the local ID components. Referring to FIG. 4, the bus identification IDs of nodes 512–524 are indicated by the letters a, b, and c and the local ID is indicated by the numbers 0–4.

Alpha portal 504 is responsible for rejecting missed address asynchronous data packets by accepting these requests and returning error reporting responses. The previous and current prime and alpha portal identifiers are used to classify nodes when an interconnect topology changes, and the alpha portal is the isochronous clock reference for other nodes on the bus.

Bus bridge topology 500 may change and be established dynamically during operation of bus bridge system 500. In one embodiment, the bus bridge topology 500 is established during net refresh. Within topology 500, portals selectively route packets. Asynchronous routing tables are stable until topology 500 changes during a net refresh or net reset operation. Asynchronous routing tables are dynamic and are changed by their asynchronous connect and disconnect operations of the protocols.

FIG. 5 is a block diagram of one embodiment for a looped bus bridge topology 600. Referring to FIG. 5, during node 300 addition, portal 606 may be added to the topology 600 forming a loop. Thus, a path exists from a0–b4 through c0 back to a0. During initialization, the redundant portal 606 is disabled so that a hierarchical bus bridge topology remains.

In an alternate embodiment, cyclical net topologies may be allowed. In this alternate embodiment, software routines may partially activate the redundant bridge 606 and allow a shortest path routing between nodes. For example, traffic between bus a 605 and bus c 615 may be efficiently routed without introducing deadlocks.

Figure 6:
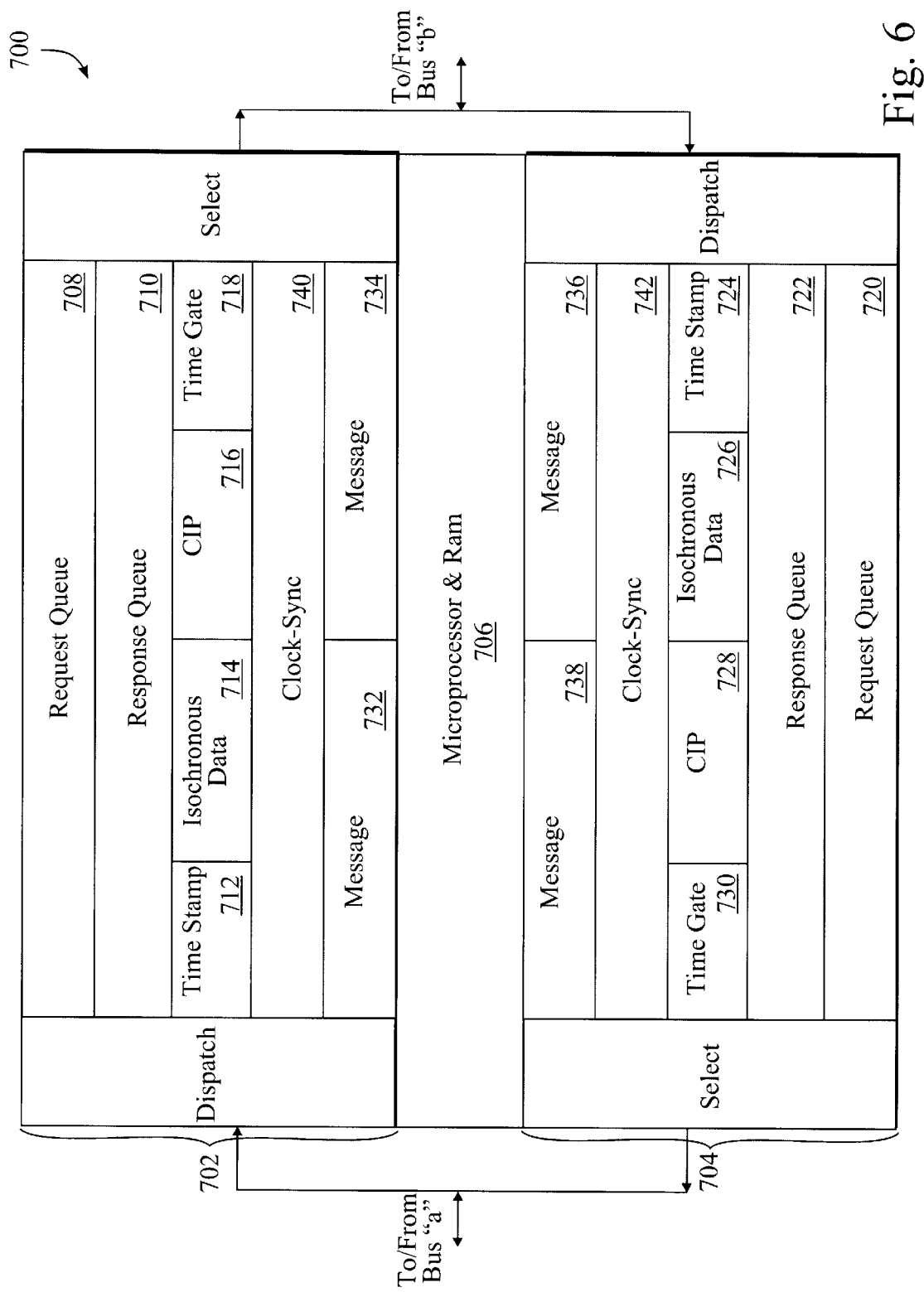
FIG. 6 is a block diagram of one embodiment for bus bridge components.

FIG. 6 is a block diagram of one embodiment for bus bridge components 700. Referring to FIG. 6, bus bridge components 700 are maintained within each portal in which bus "a" to bus "b" components 702 and bus "b" to bus "a" components 704 are independently maintained. Components 700 also contains shared microprocessor and RAM 706.

Asynchronous and isochronous packet transfers may not acquire a bus at the same time. Therefore, asynchronous packets are placed in request queues 708, 720 and response queues 710, 722. The asynchronous packets are selected for transfer at times when isochronous packets are not being transferred. Isochronous packets are received and time stamped 712, 724. Time gates 718, 730 release the isochronous packets 714, 726, together with common isochronous packet (CIP) headers 716, 728, at fixed times. Routing tables select which asynchronous and isochronous packets are accepted and queued for adjacent bus delivery.

Topologies may share physical buffer space rather than implementing physical distinct stacks subject to the following: bus "a" to bus "b" and bus "b" to bus "a" queues operate independently, response processing is never blocked by queued requests, and asynchronous subactions and isochronous packets are forwarded independently. Topologies may block a request behind the previously queued response without generating potential deadlocks; however, requests and responses are processed independently.

Isochronous routing decisions are made by checking the isochronous packet's channel number. Accepted packets are converted and retransmitted on the adjacent bus with newly assigned channel numbers, speeds, and CIP-header and, when a CIP-header is provided, time-stamp parameters 716, 728 from the CIP-header. CIP-headers may be pre-appended to some isochronous packets to further describe their format and function and desired presentation time. When the packets incur delays while traversing through a bridge, then presentation time must be adjusted to compensate for this delay. CIP headers are defined in ISO/IEC 61883 specification. Isochronous packets received in cycle n are forwarded to the adjacent bus in cycle n+k where k is an implementation dependent constant. Messages may be passed around one bus or pass through a bridge by writing to a standardized message location 732, 734, 736, 738 on a bridge's portal. This allows bus-interconnect topologies to be restored while freezing, or discarding when necessary, previously queued subactions.

Distribution of clock-sync information 740, 742 from the primary-bus source is performed by placing calibration information in isochronous-clock pseudo queues before forwarding this information to the clock master on the adjacent portal. In one embodiment, clock-sync information flows from the primary bus downward, so that only one clock-sync pseudo queue may be required.

In support of bus bridges, each node has two node ID addresses: physical ID address and virtual ID address. A physical node ID has a $3FF_{16}$ valued bus ID; a virtual node ID has smaller bus ID addresses. In the absence of bus bridges, all nodes are accessed through their physical addresses. In the presence of bus bridges, the physical address is used to configure the node and the virtual address is normally used thereafter.

Directed-asynchronous routing decisions are made by checking the destination ID addresses of pass-through packets. Accepted packets are directly routed to the bridge's opposing port. In addition, an asynchronous quarantine is maintained which selectively enables forwarding of a request sub-action based on the local identification of a bus-local requester. A set of legacy bits identifies local nodes which requires specific processing of sourced requests and returning responses.

Figure 7:
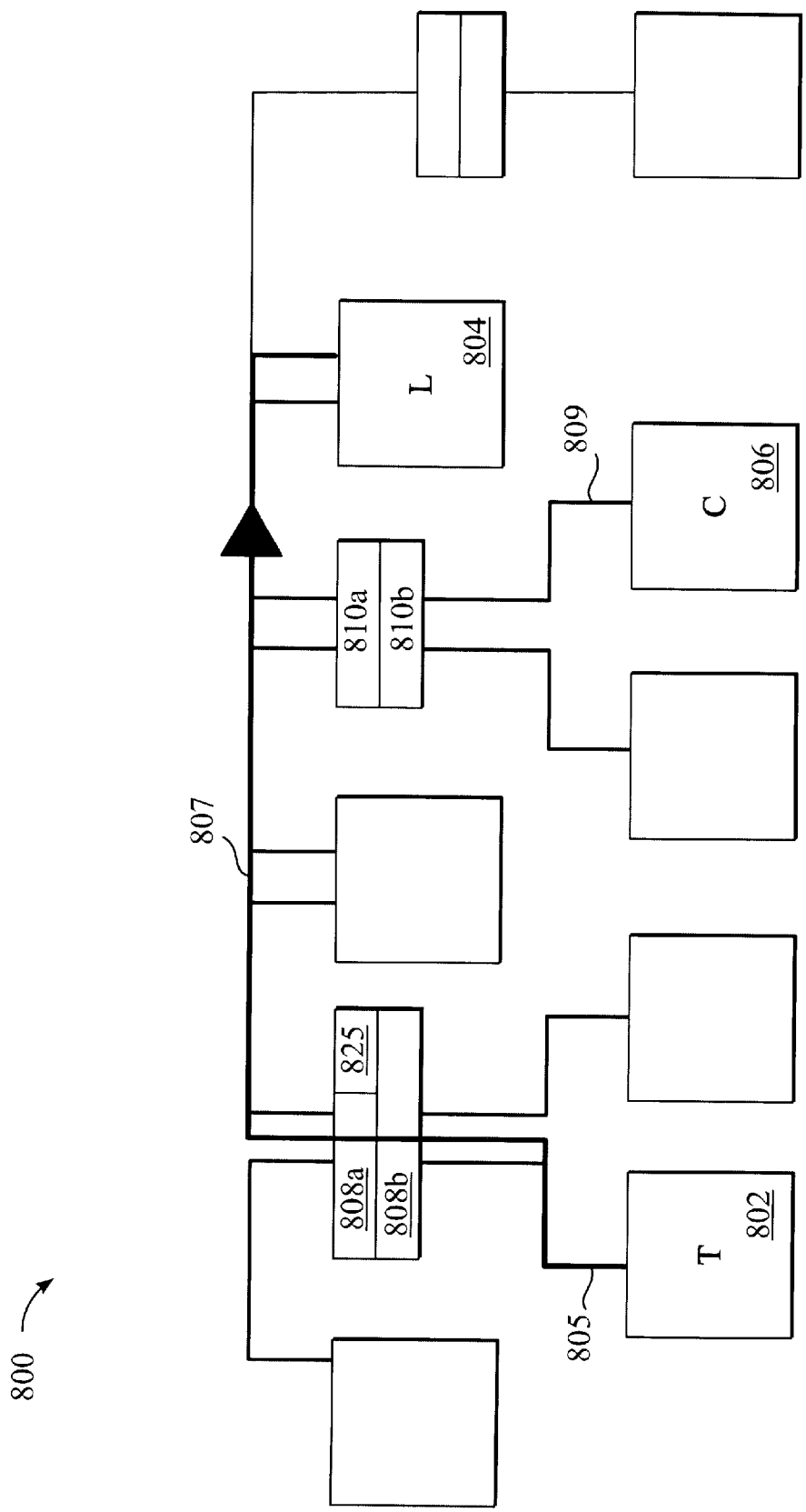
FIG. 7 is a block diagram of one embodiment for bus bridge isochronous transfer.

FIG. 7 is a block diagram of one embodiment for bus bridge isochronous transfer. Referring to FIG. 7, isochronous connections involve one talker 802 and one or more multiple listener 804/controller 806 pairs. Isochronous packets are accepted based on the current channel identification and are retransmitted on the adjacent bus with a new channel ID. A controller 806 establishes an isochronous connection. The isochronous connection enables communication between talker 802 and listener 804. An isochronous connection may be made between a single talker 802 and multiple listeners 804.

Isochronous non-overlaid connections proceed as follows: controller 806 sends a message to the final portal 810a in the path towards listener 804. If necessary, portal 810a forwards the message to the first portal on the path between the listener 804 and talker 802 (in this case, portal 808a). Portal 808a acquires isochronous resources from IRM 825 on its bus. IRM may be located within portal 808a or any other node. The message is forwarded towards the talker bus 805, which results in the message being received by portal 808b. Portal 808b acquires the isochronous resources in IRM 825 and updates the oPCR within talker 802. The message is forwarded back toward listener 804, which results in it being received by portal 808a. Portal 808a updates the iPCR on listener 804 so that it listens to the correct channel. Portal 808a forwards a message-complete indicator to controller 806.

In one embodiment, a disconnect message is sent from controller to portal 810b. Portal 810b forwards the message to portal 808a which updates the IPCR on listener 804 and releases the IRM resources associated with bus 807. The message is forwarded to portal 808b. The oPCR of talker 802 is updated in order to stop transmission. Portal 808b updates the IRM resources associated with bus 805. A completion message is then sent from portal 808b to controller 806.

In an alternate embodiment, controller 806 sends a disconnect message toward listener 810a, which results in the message being received by portal 810a. Portal 810a forwards the message to portal 808a (the talker side portal of listener 804). Portal 808a forwards the message towards talker 802, which results in the message being received by portal 808b. Portal 808b updates the oPCR of talker 802 in order to stop transmission. Portal 808b accesses IRM 825 to release isochronous channel and bandwidth resources associated with bus 805. Portal 808b forwards the message toward listener 804, which results in the message being received by portal 808a. Portal 808a updates the IPCR of listener 804 in order to stop listener 804 from listening.

Portal 808a updates the IRM isochronous resources associated with bus 807. Portal 808a then sends a completion message to controller 806.

Figure 8:
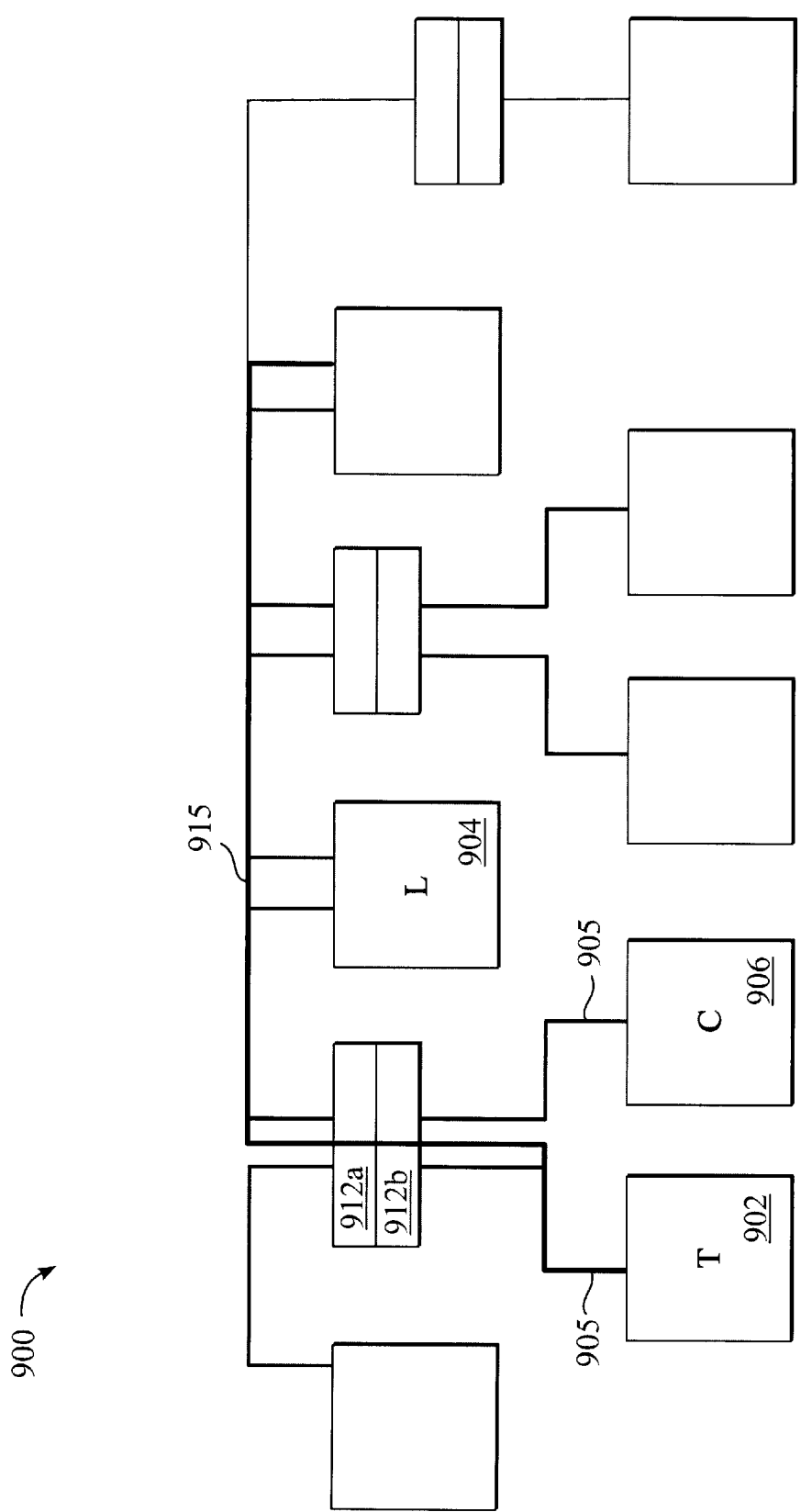
FIG. 8 is a block diagram of another embodiment for bus bridge isochronous transfer.

FIG. 8 is a block diagram of another embodiment for a bus bridge isochronous transfer. Referring to FIG. 8, a common connection isochronous transfer is illustrated. Talker 902 is connected by controller 906 to listener 904. In one embodiment, controller 906 may be on the talker bus 905, listener bus 915, or other bus. Each listener 904 is associated with a controller 906. The controller 906 may be the same or different for the various listeners 904.

In the example of FIG. 8, the connection message from controller 906 is processed by portal 912a in which it is found to have the same stream ID. This allows the new listener to listen to the previously established channel.

In one embodiment, a disconnect message is sent from controller 906 towards listener 904, which results in the message being received by portal 912a. Portal 912a updates the iPCR of listener 904 in order for listener 904 to stop listening. Portal 912a decrements its use count and returns a completion message to controller 906.

Messages are exchanged between the talker 902 and listener's controller 906 when a change in the bandwidth allocated for isochronous data traffic is requested. For example, a change in bandwidth may be requested when a talker 902, sending highly compressed isochronous video data, begins sending lightly compressed isochronous video data to a listener 904. The increased data rate of video requires an increase in the allocated bandwidth for isochronous traffic of the bus reaching the talker. The message from the talker 902 to the listener's controller follows the same data path used when the isochronous connection was originally established. The system uses the isochronous data path as a way of multicast distributing of both asynchronous messages as well as isochronous data. There may be multiple listeners and each listener may be associated with a distinct controller.

Figure 9:
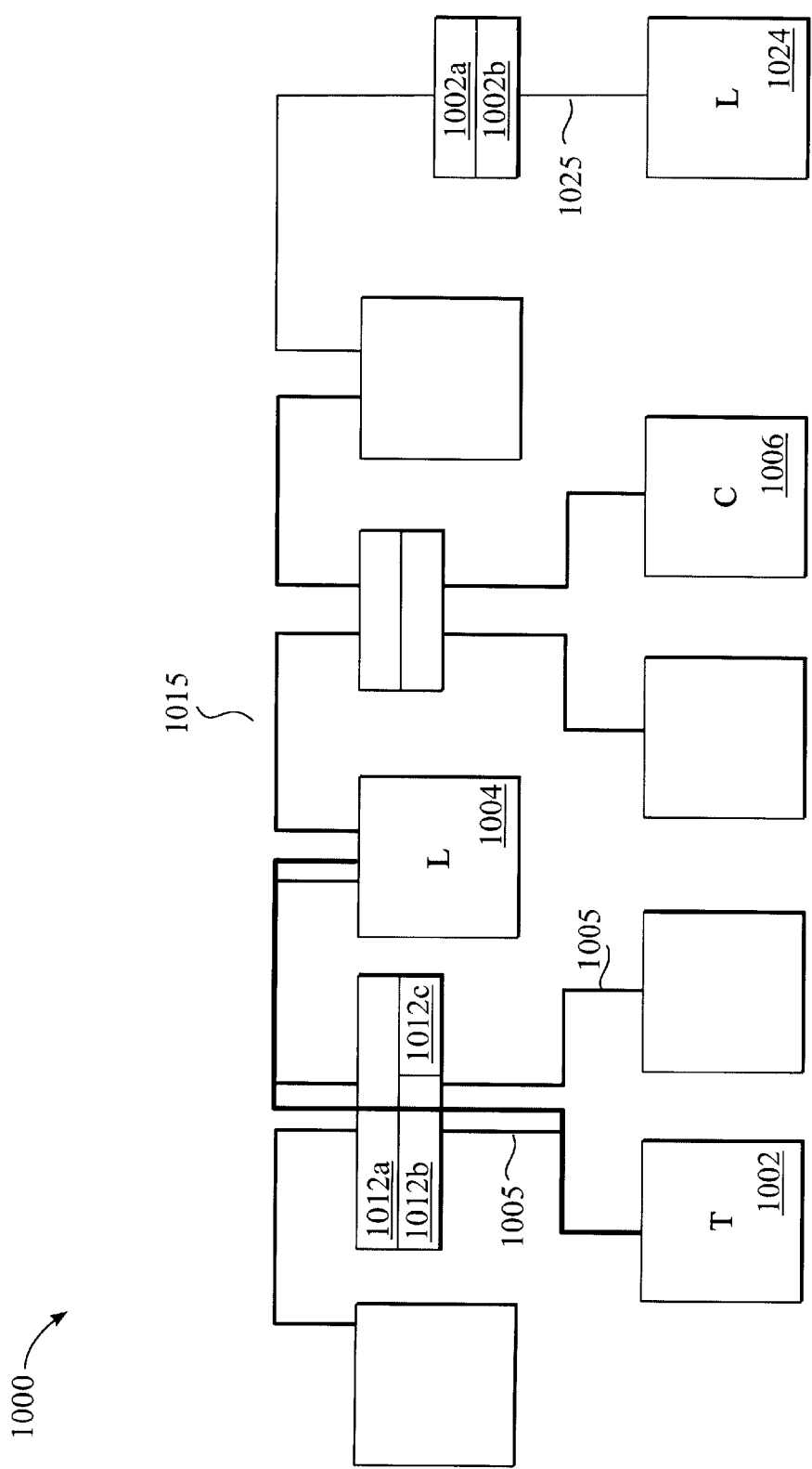
FIG. 9 is a block diagram of another embodiment for bus bridge isochronous transfer using a mechanism of partially overlaid bus connections.

FIG. 9 is a block diagram of another embodiment for bus bridge isochronous transfer using a mechanism of partially overlaid bus connections. Referring to FIG. 9, partially overlaid isochronous connections or disconnections involve one talker 1002 and one or more multiple listener 1024/controller 1006 pairs. A partially overlaid isochronous connection connects a listener to a talker through an existing connection. For example, connecting listener 1024 to the portal 1016 enables listener 1024 to listen to the talker 1002 because portal 1016 is already connected to talker 1002. Likewise, the partially overlaid isochronous disconnection removes a listener from a previously established connection.

Isochronous partially overlaid connections proceed as follows: controller 1006 sends a content message to the listener bus 1012b. Listener bus portal is also the listener's talker-path portal. The talker-path portal 1002b accesses IRM, which could be on any node, to acquire isochronous bandwidth and channels. Next, portal 1002b forwards the content message to portal 1002a. When portal 1002b detects matching stream identifications, it increases its use count. Portal 1002a subsequently returns a message to portal 1002a indicating which channel the listener 1024 should listen. Portal 1002b updates the IPCR within listener 1024. Portal 1002b sends a message of connection completion to controller 1006.

In one embodiment, isochronous partially overlaid disconnection proceeds as follows: controller 1006 forwards a content message to listener 1024 via portal 1002b for disconnection or stop listening. When portal 1002b receives the content message, portal 1002b writes the IPCR within the listener 1024. Next, portal 1002b releases bus 1005, channel, and bandwidth. Portal 1002b subsequently forwards the content message to portal 1002a, which stops listening. Portal 1002a forwards the content message to portal 1012a in which the portal 1012a decrements use count. A message of disconnection completion is forwarded to controller 1006.

In another embodiment, isochronous partially overlaid disconnection proceeds as follows: controller 1006 forwards a content message to listener 1024 in which listener 1024 stops listening. The message is forwarded to talker 1002. When portal 1012a receives the message, it decrements use count and sends the message toward listener 1024 in which portal 1002a receives the message first. Once the message is received, portal 1002a stops listening and forwards the message to portal 1002b. After portal 1002b receives the message, it writes iPCR within listener 1024 and subsequently releases bus 1005 and IRM resources. After releasing the resources, portal 1002b sends a completion message to controller 1006.

Still referring to FIG. 9, a block diagram of one embodiment for adjusting bandwidth that allocates isochronous data traffic on interconnected data buses is shown. Bandwidth adjustment messages do not require any additional routing tables, since the messages flow through bus bridges in the same manner that communication connections are initially established. Furthermore, bus bridge portals need no modification to handle bandwidth adjustment requests, since the requests are handled by controllers.

The oPCR of talker 1002 indicates the current bandwidth allocated for isochronous data on the talker 1002 bus. The oPCR is updated to reflect the new bandwidth.

In one embodiment, talker 1002 senses that more bandwidth will be needed. In addition to updating its oPCR, the talker 1002 requests from IRM 1012c that the bandwidth be increased for bus transactions. IRM 1012c senses a change in bandwidth as indicated by the talker-initiated transaction oPCR and instigates a series of message transactions. The message transactions indicating a bandwidth change are sent from the talker 1002 towards the listener portal 1002b, through any intermediary portals 1012a, 1016a, 1002a. The listener portal 1002b forwards the message to the listener controller 1006. Finally, the listener controllers re-establish the talker 1002—to—listener 1024 connection with the revised bandwidth parameters. The same flow occurs between talker 1002 and listener 1004.

Talker 1002 is connected via talker bus 1005 with IRM 1012c. The IRM 1012c is located in bus bridge talker portal 1012b. In alternate embodiments, the IRM 1012c may be an independent node connected to any point on the data bus. In one embodiment, the IRM 1012c detects the bandwidth change when it is accessed by the talker bus transaction. IRM 1012c is connected via portals 1012a, 1016a, and 1016b with controller 1006. The bus bridge identifies established isochronous streams using the connection's unique stream identifier, and does not forward bandwidth adjustments which conflict with that stream identifier. A listener portal 1002b also stores the stream identity of the data stream between talker 1002 and listener 1024 in a pilot proxy. The pilot proxy stores the communication channel identity of the data stream out of the talker 1002 and the channel of the data stream into the listener.

When the bandwidth has been changed, IRM 1012c informs the talker portal 1012b. Talker portal 1012b maintains knowledge of local listeners and their controllers that are paired together—that is which controller initially set-up the listener connection. Thus, the talker portal 1012b can signal controller 1006 that the bandwidth requirements have changed. The talker portal 1012b also informs neighboring intermediary portals of the bandwidth change, if the listener count indicates others are listening.

Portal 1012b is connected via intermediary bus 1015 with another listener 1004, and intermediary portal 1012a. As with the talker portal 1012b, intermediary portal 1012a forwards the bandwidth change request generated by talker 1002. Intermediary controllers are informed of the need to adjust the bandwidth of the data bus it controls via the intermediary portal. In one embodiment, multiple listeners may exist, where each listener may be associated with a distinct controller. Each controller would update its bandwidth allocations as described above. Thus all controllers between the talker 1002 and listener 1024 are informed of the bandwidth changes.

Intermediary bus 1015 is connected via listener portal 1002b, intermediary portals 1002a, 1016a, and listener portal 1002b with listener bus 1025. As with the local and intermediary portals, listener portal 1002b informs listener controller 1006 of the need to adjust the bandwidth of the data bus it controls via the listener portal 1002b. The listener portal 1002b stores the bus address of listener 1024 and controller 1006. One listener tag is stored in the listener portal 1002b. The listener tag identifies the node identity of listener 1024, the node identity of the controller 1006, and the plug identity of the listener 1024. The listener portal 1002b also stores the stream identity of the data stream between talker 1002 and listener 1024 in a pilot proxy. The pilot proxy stores the communication channel identity of the data stream out of the talker 1002 and the channel of the data stream into the listener.

Upon receipt of the bandwidth change request, controller 1006 initiates a standard reconnection or disconnection procedure, with the revised bandwidth parameters as discussed above. Thus, if the controller 1006 is unable to acquire the bandwidth, standard error messages are generated, just as if the controllers were unable to acquire the bandwidth during initialization of the bus connections. Furthermore controller 1006 determines how much additional bandwidth is necessary. Until controller 1006 negotiates new bandwidth parameters with their respective bus bridges, the bus bridges enforce the old bandwidth parameters.

Figure 10:
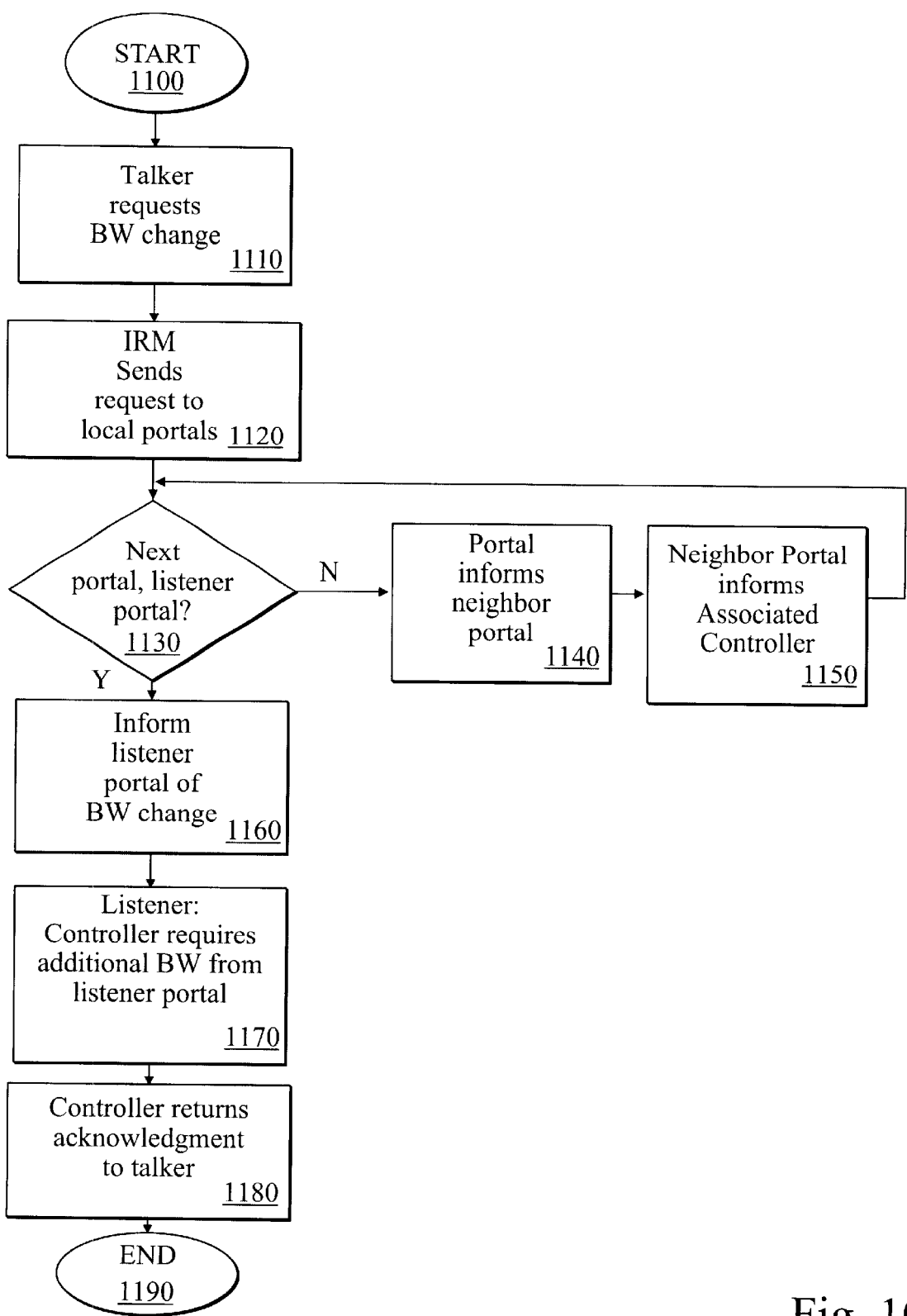
FIG. 10 is a flow diagram of one embodiment for adjusting the bandwidth allocations on interconnected data buses.

FIG. 10 is a flow diagram of one embodiment for adjusting the bandwidth allocations on interconnected data buses. A brief overview of the techniques include the talker 1002 sensing that more bandwidth will be needed. Besides updating its oPCR, the talker 1002 requests from IRM 1012c that the bandwidth be increased for bus transactions. IRM 1012c senses a change in bandwidth as indicated by the talker's request and instigates a series of message transactions. The message transactions indicating a bandwidth change are sent from the talker 1002 towards the listener controller 1006, through any intermediary portals 1012a, 1016a. The listener portal 1002b forwards the message to the listener controller 1006. Finally the listener controllers reestablish the talker 1002—to—listener 1024 connection with the revised bandwidth parameters.

Initially at processing block 1110, talker 1002 requests a bandwidth change from IRM 1012c. At processing block 1120, this bandwidth adjustment request is passed on to a talker portal 1012b. At decision block 1130 the talker portal 1012b determines if the next portal on the bus is the listener portal 1002b. If the next portal is not the listening portal, processing continues at processing block 1140. If the next portal is the listener portal, processing continues at processing block 1160. At processing block 1140, talker portal 1012b informs the intermediary portal of the bandwidth change. At processing block 1150, the bandwidth change request is passed to controller 1040 associated with the intermediary portal.

If at processing block 1130 it is determined that the next portal on the bus is the listener portal 1002*b*, then at processing block 1160 talker portal 1012*b* informs the listener of the bandwidth change. At processing block 1170, listener controller 1006 acquires any additional bandwidth required from the listener portal 1002*b*. At processing block 1180, listener 1006 returns an acknowledgment to the talker 1002.

The specific arrangements and methods herein are merely illustrative of the principles of this invention. Numerous modifications in form and detail may be made by those skilled in the art without departing from the true spirit and scope of the invention.

What is claimed is:

1. A method of adjusting the bandwidth allocated for isochronous data traffic on interconnected data buses, comprising:

sensing a bandwidth change request from a talker by an isochronous resource manager (IRM); and instigating a bandwidth adjustment associated with the bandwidth change request from the IRM to one or more bus bridge portals.

2. The method of claim 1, further comprising:

modifying the bandwidth change request in the one or more bus bridge portals, wherein channel assignments and connections are maintained.

3. The method of claim 1, wherein one or more controllers modify bandwidth allocations associated with the bandwidth change request.

4. A method of adjusting the bandwidth allocated for isochronous data traffic on interconnected data buses, comprising:

providing a bandwidth change request via a talker bus bridge portal from a talker to an isochronous resource manager (IRM); and providing the bandwidth change request from the IRM to one or more bus bridge portals, wherein at least one of the one or more bus bridge portals is a listener portal and at least one of the one or more bus bridge portals is an intermediary portal.

5. The method of claim 4, further comprising providing the bandwidth change request from the listener portal and one or more listener controllers.

6. The method of claim 4, wherein the data buses are substantially compatible with the IEEE 1394 serial bus standard.

7. The method of claim 4, wherein the talker bus bridge portal provides the bandwidth change request for the talker.

8. The method of claim 7, further comprising providing the bandwidth change request from the talker portal to the one or more intermediary portals.

9. The method of claim 8, further comprising informing one or more intermediary controllers associated with the one or more intermediary portals of the bandwidth change request.

10. The method of claim 9, wherein one of the one or more intermediary portals is the listener portal that informs the listener controller of the bandwidth change request.

11. The method of claim 10, wherein the listener controller returns a confirmation message to the talker.

12. A bus bridge interconnect, comprising:

an isochronous resource manager (IRM) associated with a talker; and a plurality of bus bridge portals to accept bandwidth change requests from the IRM;

wherein the IRM signals a bandwidth change request to the plurality of bus bridge portals.

13. The system of claim 12, wherein the data bus is substantially compatible with the IEEE 1394 serial bus standard.

14. The system of claim 12, wherein the talker provides the IRM with a bandwidth change request.

15. The system of claim 12, wherein the bus bridge portal is a talker portal that provides the bandwidth change request for the talker.

16. The system of claim 15, wherein at least one of the plurality of bus bridge portals is an intermediary portal connected with the talker portal.

17. The system of claim 16, further comprising one or more intermediary controllers connected with the at least one intermediary portal.

18. The system of claim 17, further comprising a listener portal connected with the at least one intermediary portal.

19. The system of claim 12, further comprising a listener controller connected with a listener portal, wherein the listener controller returns a confirmation message to the talker.

20. A bus bridge interconnect, comprising:

means for providing a bandwidth change request via a talker bus bridge portal from a talker to an isochronous resource manager (IRM); and means for providing the bandwidth change request from the IRM to one or more bus bridge portals, wherein one or more bus bridge portals are listener portals and one or more bus bridge portals are intermediary portals.

21. The system of claim 20, further comprising means for providing the bandwidth change request to the isochronous resource manager from a talker.

22. The system of claim 20, wherein one of the one or more bus bridge portals is the talker bus bridge portal that provides the bandwidth change request for the talker.

23. The system of claim 22, further comprising means for providing the bandwidth change request from the talker bus bridge portal to the one or more intermediary portals.

24. The system of claim 23, further comprising means for informing one or more intermediary controllers associated with the one or more intermediary portals of the bandwidth change request.

25. The system of claim 24, wherein the one or more listener portals informs a listener controller of the bandwidth change request.

26. The system of claim 25, wherein the listener controller includes means for returning a confirmation message to the talker.

27. A bus bridge interconnect, comprising:

means for sensing a bandwidth change request from a talker by an isochronous resource manager (IRM); and means for instigating a bandwidth adjustment associated with the bandwidth change request from the IRM to one or more bus bridge portals.

28. The system of claim 27, further comprising:

means for modifying bandwidth change requests in bus bridge portals, wherein channel assignments and connections are maintained.

29. The system of claim 1, wherein one or more controllers modify bandwidth allocations associated with the bandwidth change request.

* * * * *